US009080914B2

United States Patent
Kinugasa

(10) Patent No.: US 9,080,914 B2
(45) Date of Patent: Jul. 14, 2015

(54) PHOTOELECTRIC CONVERSION APPARATUS USING FIXED PATTERN NOISES OF SENSOR AND MEMORY CELLS

(71) Applicant: CANON KABUSHIKI KAISHA, Tokyo (JP)

(72) Inventor: Tomohisa Kinugasa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 13/930,547

(22) Filed: Jun. 28, 2013

(65) Prior Publication Data

US 2014/0009664 A1    Jan. 9, 2014

(30) Foreign Application Priority Data

Jul. 4, 2012    (JP) ................. 2012-150839

(51) Int. Cl.
*G01J 1/44*    (2006.01)
*H04N 5/378*    (2011.01)
*H04N 5/357*    (2011.01)
*G03B 13/36*    (2006.01)

(52) U.S. Cl.
CPC . *G01J 1/44* (2013.01); *H04N 5/357* (2013.01); *H04N 5/378* (2013.01); *G03B 13/36* (2013.01)

(58) Field of Classification Search
CPC ......... H04N 5/357; H04N 5/378; G03B 13/36
USPC .............. 348/345, 294, 241, 222.1, 248, 308; 396/125
See application file for complete search history.

(56) References Cited

U.S. PATENT DOCUMENTS

| 8,503,873 | B2 * | 8/2013 | Inoue et al. | ................... 348/241 |
| 2004/0027472 | A1 * | 2/2004 | Endo et al. | ................... 348/308 |
| 2011/0134272 | A1 * | 6/2011 | Kinugasa | ................... 348/222.1 |
| 2013/0026349 | A1 * | 1/2013 | Kinugasa | ............... 250/214 SW |

FOREIGN PATENT DOCUMENTS

JP    9-200614 A    7/1997

* cited by examiner

*Primary Examiner* — Nhan T Tran
(74) *Attorney, Agent, or Firm* — Canon USA, Inc. IP Division

(57) ABSTRACT

A photoelectric conversion apparatus includes a sensor cell unit including: a photoelectric conversion unit and a sensor cell unit writing switch connected to the photoelectric conversion unit; a memory cell unit including a memory capacitance and a memory cell unit writing switch connected to the memory capacitance; and a common signal line connected to the sensor cell unit and the memory cell unit, and the memory cell unit holds a signal including voltage fluctuation of the photoelectric conversion unit due to an OFF operation of the sensor cell unit writing switch, a fixed pattern noise of the sensor cell unit, and a fixed pattern noise of the memory cell unit to the memory capacitance before holding a signal of the photoelectric conversion unit to the memory capacitance.

13 Claims, 13 Drawing Sheets

PHOTOELECTRIC CONVERSION APPARATUS USING FIXED PATTERN NOISES OF SENSOR AND MEMORY CELLS

BACKGROUND OF THE INVENTION

1. Field of the Invention

The present disclosure related to a photoelectric conversion apparatus, a focus detection apparatus, an image pickup system, and a method of driving a photoelectric conversion apparatus.

2. Description of the Related Art

An image pickup system typically includes an auto focusing (AF) sensor that detects a focus. A recent AF sensor requires not only multipoint of the number of ranging points but also high precision focus detection. As a means to increase the number of ranging points, an area-type AF is employed in which a plurality of linear sensors that configures the ranging points is disposed in parallel and is connected with a common wiring in the line direction. As a circuit configuration of the area-type AF, Japanese Patent Application Laid-Open No. 9-200614 discloses a solid-state image pickup apparatus provided with a transfer system that transfers a signal output from a sensor cell unit to a memory cell unit. To enhance the focusing precision of AF by increasing an SN ratio of a sensor signal, Japanese Patent Application Laid-Open No. 9-200614 causes the sensor cell unit and the memory cell unit to have an inverting output function of a signal to remove fixed pattern noises of the sensor cell unit and the memory cell unit itself.

Further, it is known that the AF sensor detects the highest value and the lowest value of an accumulation signal and performs an operation of properly controlling an amplitude value of the accumulation signal (auto gain control: AGC) in order to realize a broad dynamic range. The precision of accumulation control relates to the AF precision. Therefore, by removing a fixed pattern noise of a sensor from the accumulation signal used in AGC, the AF precision can be enhanced. Japanese Patent Application Laid-Open No. 9-200614 removes the fixed pattern noises from the accumulation signal by holding the fixed pattern noises of the sensor cell unit and the transfer unit in the sensor cell unit.

However, like Japanese Patent Application Laid-Open No. 9-200614, if the fixed pattern noises are held in the sensor cell unit, there may be a problem when a detected capacity of a photocarrier is made small. This is because a switch means of the sensor cell unit in Japanese Patent Application Laid-Open No. 9-200614 becomes a new cause of noise generation. In a case where the switch means is configured from a MOS transistor, fluctuation of gate potential is propagated to a source and drain of the MOS transistor at the time of switch OFF (clock feed-through). Further, a carrier held under gate at the time of switch ON is moved to the source or drain at the time of switch OFF (charge injection). A voltage fluctuation amount of the source and drain at the time of switch OFF depends on the potential of the source and drain immediately before the switch OFF. That is, like Japanese Patent Application Laid-Open No. 9-200614, when the fixed pattern noises are held in a photodiode of the sensor cell unit through the switch means, variation corresponding to the fixed pattern noises appears in the source and drain potential among pixels. Then, the voltage fluctuation amount caused at the time of switch OFF varies among the pixels. Therefore, the fixed pattern noises held in the photodiode are different from fixed pattern noises that are intrinsically supposed to be removed. As a result, the fixed pattern noises cannot be sufficiently removed from the accumulation signal at the AGC, and therefore, the AGC precision and the AF precision are lowered.

In recent years, the AF sensor also requires high sensitivity with the requirement of the high sensitivity for an image pickup element. To enhance the high sensitivity of a sensor, the detected capacity is made small. However, from the above reason, there is a problem such that the voltage fluctuation at the time of switch OFF becomes large and the AGC precision is lowered, when the detected capacity is made small.

SUMMARY OF THE INVENTION

A photoelectric conversion apparatus according to the present disclosure includes: a sensor cell unit including a photoelectric conversion unit and a sensor cell unit writing switch connected to the photoelectric conversion unit; a memory cell unit including a memory capacitance and a memory cell unit writing switch connected to the memory capacitance; and a common signal line connected to the sensor cell unit and the memory cell unit, and the memory cell unit holds a signal including voltage fluctuation of the photoelectric conversion unit due to an OFF operation of the sensor cell unit writing switch, a fixed pattern noise of the sensor cell unit, and a fixed pattern noise of the memory cell unit, to the memory capacitance before holding a signal of the photoelectric conversion unit to the memory capacitance.

Further features of the disclosure will become apparent from the following description of exemplary embodiments (with reference to the attached drawings).

DESCRIPTION OF THE EMBODIMENTS

One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

First Embodiment

Figure 1:
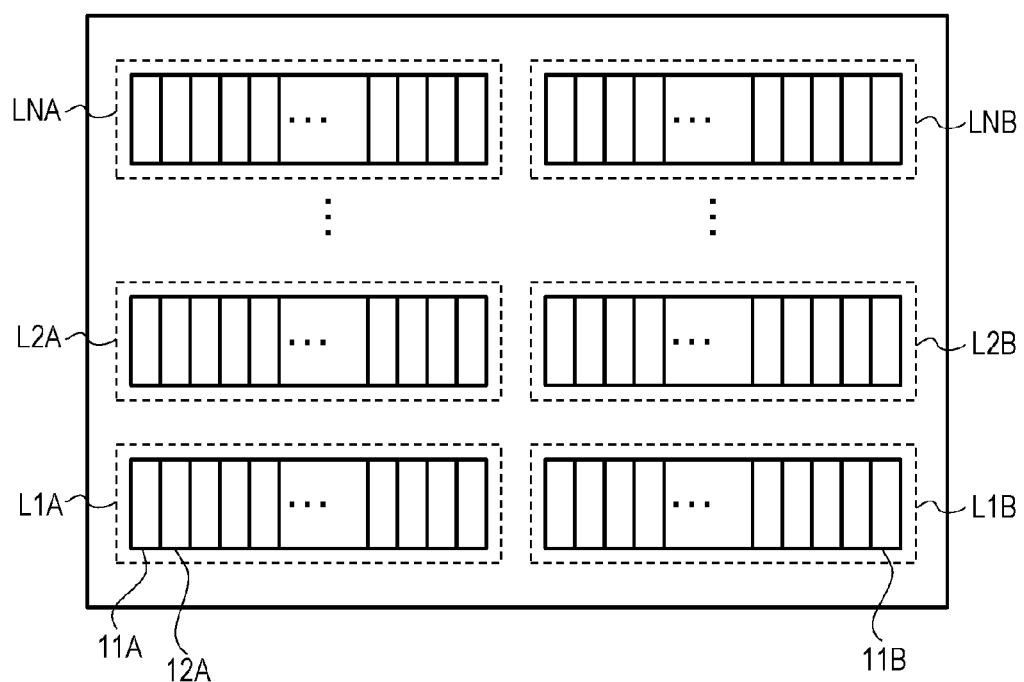
FIG. 1 is a diagram illustrating a configuration example of a photoelectric conversion apparatus according to a first embodiment.

FIG. 1 is a diagram schematically illustrating an image pickup area of a photoelectric conversion apparatus for phase difference focus detection (auto focusing: AF) according to a first embodiment. The image pickup area includes line sensor units L1A and L1B, L2A and L2B, . . . , and LNA and LNB, each two of which make pairs. A pair of line sensor units is used to measure an amount of de-focusing of an object in a certain area in an image pickup area, and the accuracy of AF can be improved by arranging a plurality of the pair of line sensor units to provide a plurality of ranging points. A configuration in which a disposition interval between pixel aperture portions of the line sensor units L1A to LNA, and L1B to LNB is narrowed and the line sensors are disposed in a two-dimensional array manner is called an area-type AF sensor. Each of the line sensor units L1A to LNA includes a plurality of unit pixels 11A, 12A, . . . , and each of the line sensor units L1B to LNB also includes a plurality of unit pixels 11B, . . . .

Figure 2:
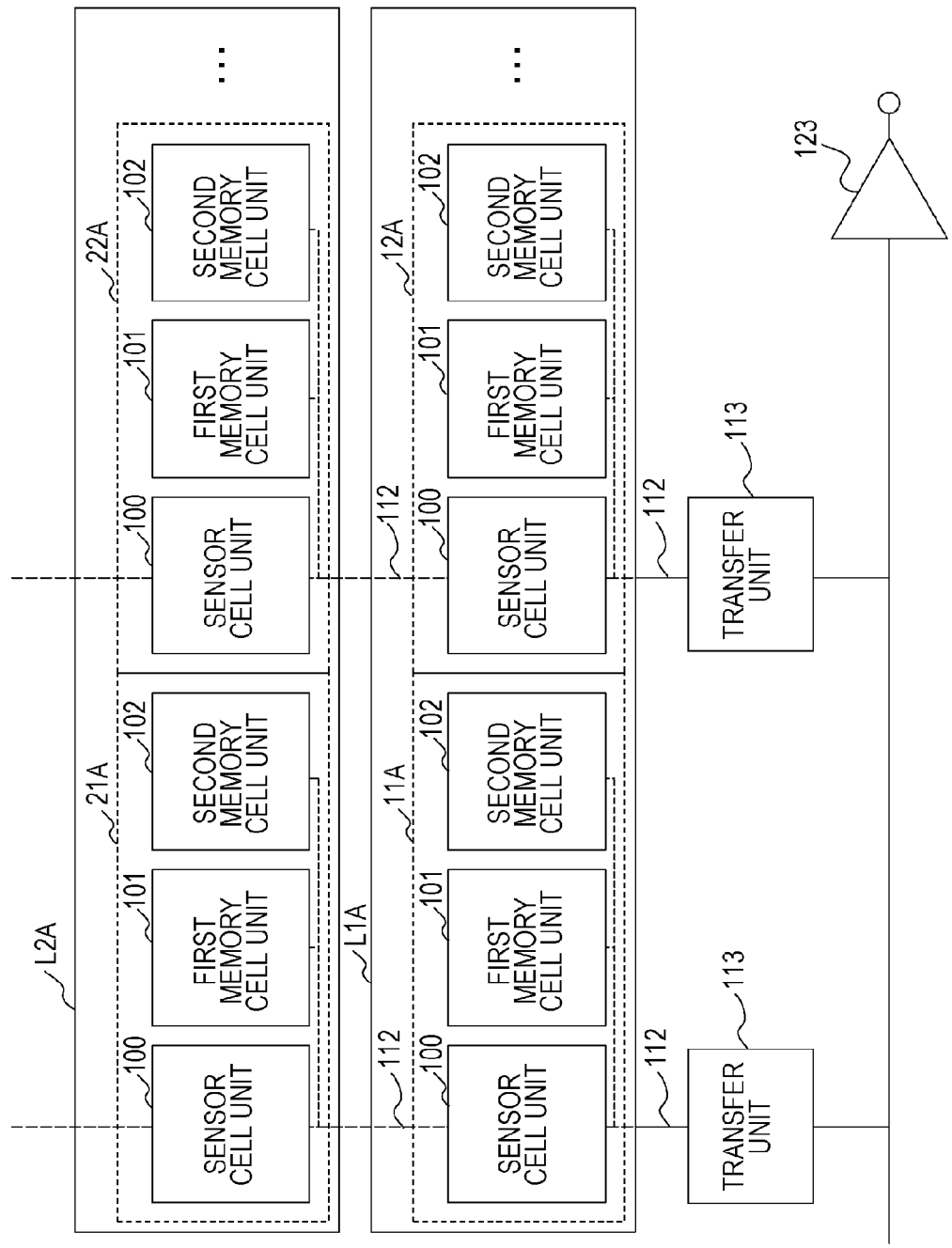
FIG. 2 is a block diagram of a line sensor unit according to the first embodiment.

FIG. 2 is a block diagram illustrating the line sensor units L1A and L2A in more detail. The line sensor unit L1A includes unit pixels 11A, 12A, . . . . The line sensor unit L2A includes unit pixels 21A, 22A, . . . . Each of the unit pixels 11A, 12A, 21A, and 22A includes a sensor cell unit 100, a first memory cell unit 101, and a second memory cell unit 102, and is connected to a common signal line 112. Further, the unit pixels that exist at similar positions in the different line sensor units L1A and L2A (for example, the pixels 11A, 21A, . . . ) are connected to the common transfer unit 113 through the common signal line 112. Each of the transfer units 113 is connected to a common buffer amplifier 123. The line sensor units L1B, L2B, . . . have similar configuration to FIG. 2.

Figure 3:
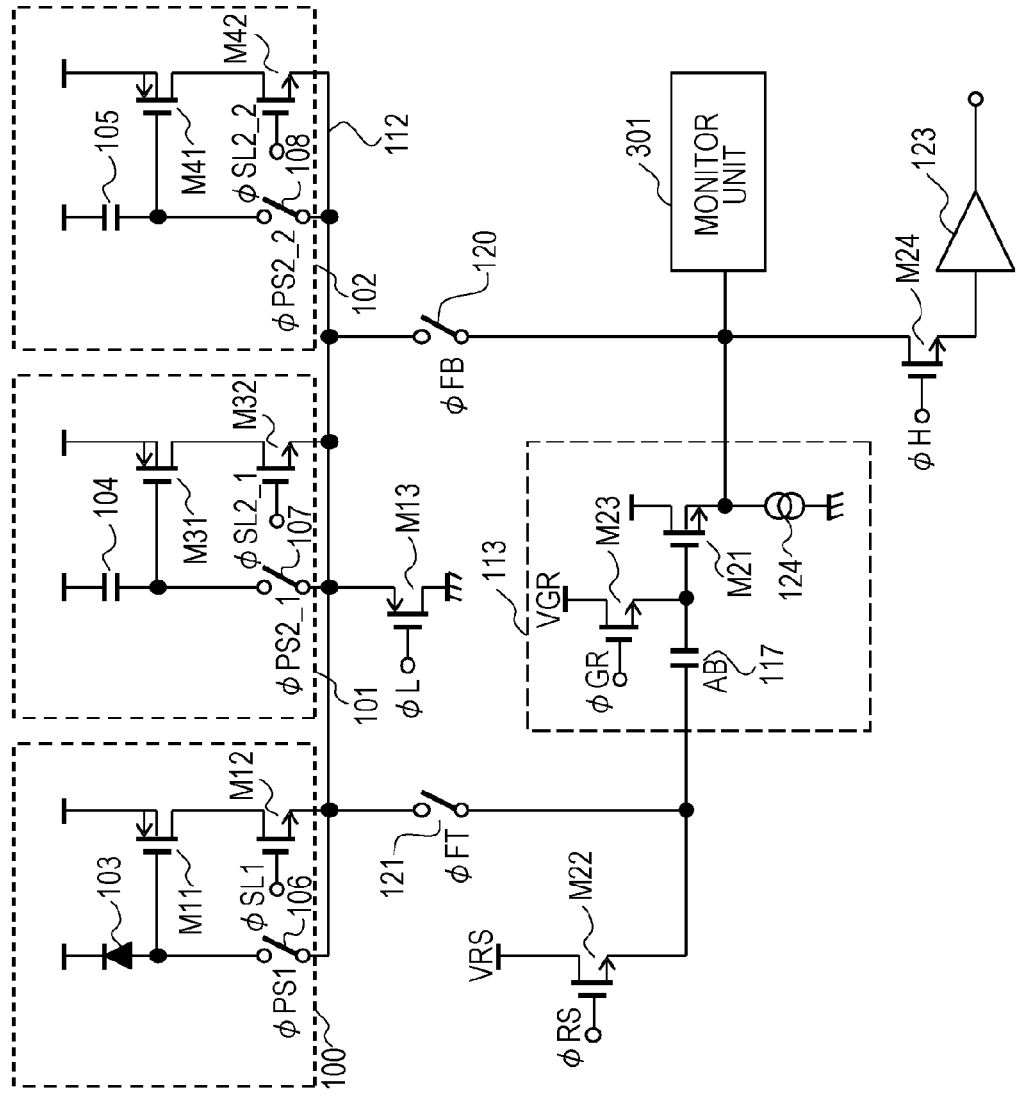
FIG. 3 is a circuit diagram of a photoelectric conversion apparatus according to the first embodiment.

FIG. 3 is a diagram illustrating a configuration example of a photoelectric conversion apparatus obtained by a part of FIG. 2 being extracted, and description will be given especially focusing on the unit pixel 11A and the transfer unit 113 connected thereto. The unit pixel 11A includes a sensor cell unit 100, a first memory cell unit 101, and a second memory cell unit 102. In FIG. 3, φPS1, φSL1, and the like denoted to a control electrode and a switch of a MOS transistor mean signals supplied from a control unit (not illustrated).

Focusing on the unit pixel 11A, the sensor cell unit 100 includes a photodiode 103 that is a photoelectric conversion unit, a sensor cell unit writing switch 106, and transistors M11 and M12. An anode of the photodiode 103 is connected to one terminal of the sensor cell unit writing switch 106 and a control electrode of the transistor M11, and a cathode is connected to a power source node. The transistor M11 configures a source ground inverting amplifier having a gain of −1 with a load MOS transistor M13. The sensor cell unit 100 outputs an accumulation signal based on an amount of electric charges obtained by being subjected to photoelectric conversion in the photodiode 103 to the common signal line 112 through a sensor cell unit inverting amplifier of the transistor M11. The inverting amplifier of the transistor M11 outputs a signal based on the signal of the photodiode 103. The MOS transistor M12 functions as a selection switch for selecting the sensor cell unit 100. The sensor cell unit writing switch 106 switches the anode of the photodiode 103 and a conductive state or a non-conductive state of the common signal line 112, and can be configured from a PMOS transistor, an NMOS transistor, a CMOS transistor, or the like. The memory cell units 101 and 102 have respective configurations in which the photodiode 103 in the sensor cell unit 100 is replaced with memory capacities 104 and 105, respectively. The first memory cell unit 101 includes the memory capacitance 104, a memory cell unit writing switch 107 connected to the memory capacitance 104, a transistor M31 that configures the memory cell unit source ground inverting amplifier, and a memory cell unit selection switch M32. The memory cell unit selection switch M32 is a switch for outputting an output signal of the transistor M31 to the common signal line 112. The memory cell unit amplifier of the transistor M31 is a memory cell unit inverting amplifier, and outputs a signal based on the signal held in the memory capacitance 104. The second memory cell unit 102 includes a memory capacitance 105, a memory cell unit writing switch 108 connected to the memory capacitance 105, a transistor M41 that configures the memory cell unit source ground inverting amplifier, and a memory cell unit selection switch M42. The memory cell unit selection switch M42 is a switch for outputting an output signal of the transistor M41 to the common signal line 112. The memory cell unit amplifier of the transistor M41 is a memory cell unit inverting amplifier, and outputs a signal based on the signal held in the memory capacitance 105. The common signal line 112 is connected to the sensor cell unit 100, the first memory cell unit 101, and the second memory cell unit 102.

Next, the transfer unit 113 will be described. The transfer unit 113 includes MOS transistors M21 and M23, a transfer capacity 117, and a constant current source 124, and is connectable to the common signal line 112 through switches 120 and 121. The MOS transistor M21 and the constant current source 124 form a source follower. The common signal line 112 is connected to the transfer switch 121 and the feedback switch 120. The other terminal of the transfer switch 121 is connected to one terminal A of the transfer capacity 117 and a main electrode of the MOS transistor M22. The other main electrode of the MOS transistor M22 is connected to a node of a reference voltage VRS. One main electrode of the MOS transistor M24, which is an optical signal readout switch, is connected to the buffer amplifier 123. The other terminal B of the transfer capacity 117 is connected to a control electrode of the MOS transistor M21 and one main electrode of the MOS transistor M23. The other main electrode of the MOS transistor M23 is connected to a node of a clamp voltage VGR. One main electrode of the MOS transistor M21 is connected to a node of a power source VDD. The other main electrode of the MOS transistor M21 is connected to the constant current source 124, the other terminal of the feedback switch 120, a monitor unit 301 disposed outside a sensor array, and the other main electrode of the MOS transistor M24, which is an optical signal readout switch. The transfer unit 113 performs differential processing on a signal output from the sensor cell unit 100 and a signal output from the memory cell units 104 and 105.

Figure 6:
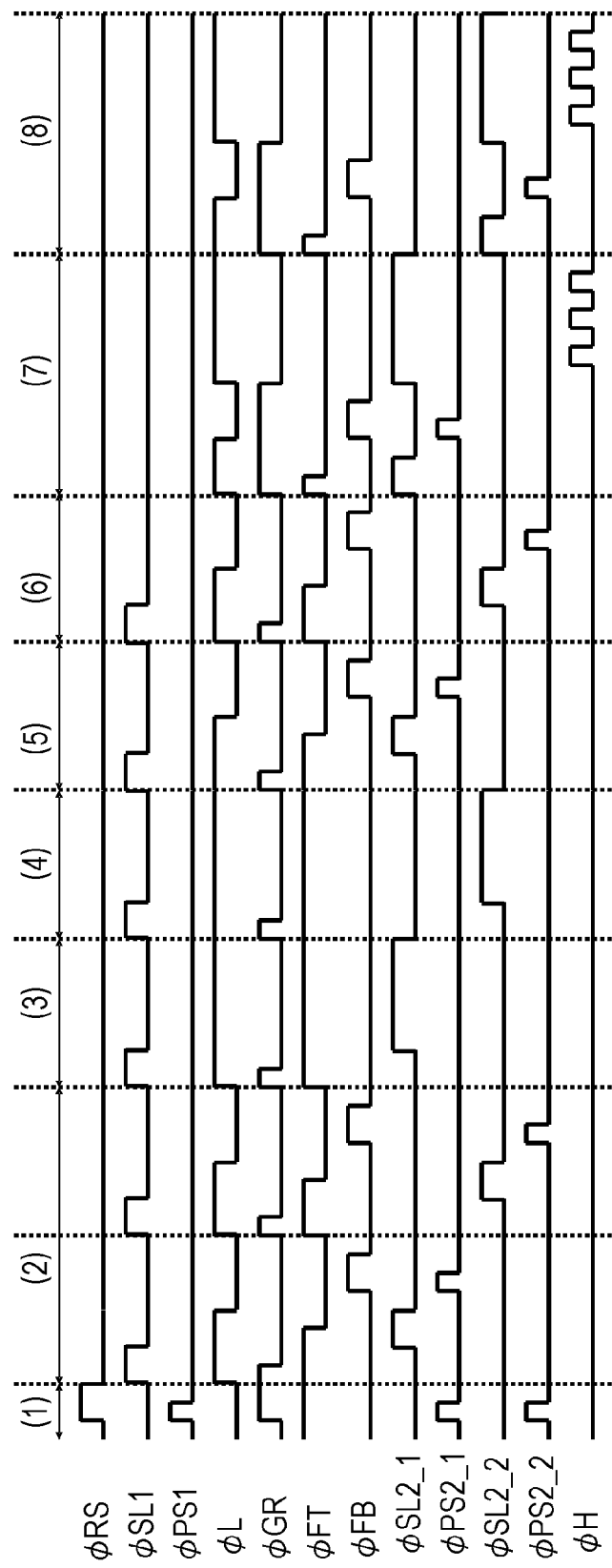
FIG. 6 is a timing diagram according to the first embodiment.

FIG. 6 illustrates a signal given to the switches and the control electrodes of the MOS transistors illustrated in FIG. 3. Hereinafter, a method of driving a photoelectric conversion apparatus according to the present embodiment will be described with reference to FIGS. 3 and 6. The switches and the MOS transistors are conducted when a signal illustrated in FIG. 6 is at a high level, and are not conducted when a signal is at a low level. The signal φL is set to have gate potential that drives a certain current such that the inverting amplifier configured from the transistor M11 and the load MOS transistor M13 outputs the potential VRS when the potential VRS is input to the transistor M11 at the high level.

During a period (1) in FIG. 6, an operation to reset the photodiode 103 and the memory capacities 104 and 105 is performed. As a specific operation, the signals ORS, φFT, φPS1, φPS2_1, φPS2_2, and φGR turn into the high level. Then, the sensor cell unit writing switch 106, the memory cell unit writing switches 107 and 108, the transfer switch 121, the MOS transistor M22, and the MOS transistor M23 are conducted. Consequently, the photodiode 103 and the memory capacities 104 and 105 are reset to have the reference voltage VRS, the terminal A of the transfer capacity 117 is reset to have the reference voltage VRS, and the terminal B is reset to have the clamp voltage VGR. Here, the clamp voltage VGR is set to be VGR=VRS+Vth, which is obtained by adding a threshold Vth of a self-bias source follower of the sensor cell unit 100, the memory cell units 104 and 105, or the transfer unit 113 to the reference voltage VRS. Next, the signals φPS1, φPS2_1, φPS2_2 and φRS turn into the low level, and an initialization operation is completed. At this time, since potential of both ends of the writing switches 106, 107, and 108 immediately before the writing switches turn OFF are equal to reset potential, the voltage fluctuation due to the above-described writing switch OFF operation is common to each bit. Therefore, only a kTC noise that depends on a capacitance value occurs in the photodiode 103 and in the memory capacities 104 and 105. Here, the capacitance values of the memory capacities 104 and 105 are sufficiently larger than a detected capacity of the photodiode 103. For example, the detected capacity of the photodiode 103 is 6 fF, while the capacitance values of the memory capacities 104 and 105 are 320 fF. The capacitance values of the memory capacities 104 and 105 are set to a degree such that the voltage fluctuation and the kTC noise when the writing switches 107 and 108 of the memory cell units 101 and 102 turn OFF is sufficiently negligible. Hereinafter, the voltage fluctuation of the photodiode 103 when the writing switch 106 including the kTC noise is OFF is Nrst. At a timing when the signal φPS1 turns into the low level, an accumulating operation period of the sensor cell unit 100 starts.

Following that, during a period (2), an operation of writing the voltage fluctuation Nrst of the sensor cell unit 100 and a fixed pattern noise Ns of the amplifier of the transistor M11 to the memory cell units 101 and 102 through the transfer unit 113 is performed. After the signals φPS1, φPS2_1, φPS2_2, and ORS turn into the low level, the signals φSL1 and φL turn into the high level. Then, VRS−Nrst+Ns, which is the voltage fluctuation Nrst of the sensor cell unit 100 and the fixed pattern noise Ns of the sensor cell unit 100 being added to the reset potential VRS, is written to the terminal A of the transfer capacity 117. Here, the reason why plus/minus of Nrst is inversed is that a gain of −1 is applied by the inverting amplifier. Then, by the signal φGR turning into the low level, the terminal B of the transfer capacity 117 enters a floating state. Further, by the signal φSL2_1 turning into the high level, signal VRS+Nm1 including a fixed pattern noise Nm1 of the transistor M31 is output from the memory cell unit 101. Since the terminal A of the transfer capacity 117 is changed to VRS+Nm1, the potential of the terminal B turns into VGR+Nrst−Ns+Nm1=VRS+Vth+Nrst−Ns+Nm1. Next, the signal φFB turns into the high level. Then, VRS+Nrst−Ns+Nm1+Nt, which is Vth of the source follower of the transfer unit 113 and the fixed pattern noise Nt being superimposed on VRS+Vth+Nrst−Ns+Nm1 held in the terminal B of the transfer capacity 117, is output to the common signal line 112. By the signal φPS2_1 temporarily turning into the high level during the period, the voltage VRS+Nrst−Ns+Nm1+Nt is written to the memory capacitance 104 of the memory cell unit 101. The memory cell unit 101 holds a signal including the voltage fluctuation Nrst, the fixed pattern noise Ns of the sensor cell unit 100, and the fixed pattern noise Nm1 of the memory cell unit 101 in the memory capacitance 104 before holding a signal of the photodiode 103 in the memory capacitance 104. The voltage fluctuation Nrst is voltage fluctuation of the photodiode 103 due to an OFF operation of the sensor cell unit writing switch 106.

A similar operation is performed with respect to the memory cell unit 102, the voltage VRS+Nrst−Ns+Nm2+Nt is written in the memory capacitance 105 of the memory cell unit 102. Here, Nm2 is a fixed pattern noise of the transistor M41 of the memory cell unit 102. The memory cell unit 102 holds a signal including the voltage fluctuation Nrst, the fixed pattern noise Ns of the sensor cell unit 100, and the fixed pattern noise Nm2 of the memory cell unit 102 in the memory capacitance 105 before holding a signal of the photodiode 103 in the memory capacitance 105.

During a period (3), an auto gain control (AGC) operation is performed. Since the signals φSL1, φL, and φFT turn into the high level, a signal of VRS−S1+Ns−Nrst according to the signal S1 that has been subjected to the photoelectric conversion in the sensor cell unit 100 appears in the common signal line 112 from the sensor cell unit 100. That is, the sensor cell unit 100 outputs a signal including the photoelectric conversion signal S1 of the photodiode 103 and the voltage fluctuation Nrst of the photodiode 103 due to an OFF operation of the sensor cell unit writing switch 106 to the common signal line 112. Further, the signal φGR is turned into the high level, the terminal B is reset to VGR (=VRS+Vth). Following that, the signal φGR is turned into the low level, and the terminal B of the transfer capacity 117 is caused to enter a floating state.

Next, after the signal φSL1 is turned into the low level, the signal φSL2_1 turns into the high level, the memory cell unit selection switch M32 is turned ON. During the period (2), a fixed pattern noise Nm1 of the memory cell unit 101 is added to VRS+Nrst−Ns+Nm1+Nt held in the memory capacitance 104 of the memory cell unit 101. Consequently, a voltage VRS−Nrst+Ns−Nt is output to the terminal A of the transfer capacity 117 from the memory capacitance 104 of the memory cell unit 101 through the common signal line 112. At this time, the terminal B of the transfer capacity 117 has a voltage VGR+S1−Nt, and a voltage VRS+S1 is output from the transfer unit 113. That is, the transfer unit 113 generates a difference signal between the output signal of the sensor cell unit 100 and the output signal of the memory cell unit 101. Since the output of the voltage VRS+S1 is input to the monitor unit 301 from the transfer unit 113, only the optical signal S1 without an effect of noise can be monitored in the monitor unit 301. The output of the sensor cell unit 100 during the period (3) is observed in the monitor unit 301 in real time. The monitor unit 301 includes a gain variable amplifying unit, and the gain is varied in accordance with a detection result of the highest value and the lowest value of an optical signal waveform and a flag of an accumulation end is set when reaching a predetermined accumulation level. This operation is called auto gain control (AGC). By performing the operation of the period (3) during an optical signal accumulation, an accumulation status of the photodiode 103 can be monitored in the monitor unit 301 in real time. An optical signal held in the sensor cell unit 100 at the time when the accumulating operation ends in the period (3) as a result of the monitoring operation in the monitor unit 301 is S2. A similar operation is performed during a period (4) with respect to the memory cell unit 102. An optical signal held in the sensor cell unit 100 at the time when the accumulating operation ends in the period (4) as a result of the monitoring operation in the monitor unit 301 is S3.

During a period (5), an operation of holding the accumulation signal S2 in the memory cell unit 101 is performed after the accumulation ends. Since the signals φSL1, φL, and φFT turn into the high level, a signal VRS−S2+Ns−Nrst according to the signal S2 that has been subjected to the photoelectric conversion in the sensor cell unit 100 appears in the common signal line 112 from the sensor cell unit 100. That is, the sensor cell unit 100 outputs a signal including the photoelectric conversion signal S2 of the photodiode 103 and the voltage fluctuation Nrst of the photodiode 103 due to the OFF operation in the sensor cell unit writing switch 106 to the common signal line 112. Further, since the signal φGR is turned into the high level, the terminal B of the transfer capacity 117 is reset to have a voltage VGR(=VRS+Vth). Following that, the signal φGR is turned into the low level, so that the terminal A and the terminal B of the transfer capacity 117 is caused to enter a floating state. Next, after the signal φSL1 is turned into the low level, the signal φSL2_1 turns into the high level, so that the memory cell unit selection switch M32 is turned ON. Then, the fixed pattern noise Nm1 of the memory cell unit 101 is added to VRS+Nrst−Ns+Nm1+Nt held in the memory capacitance 104 of the memory cell unit 101 during the period (2). Consequently, a voltage VRS−Nrst+Ns−Nt is output to the terminal A of the transfer capacity 117 through the common signal line 112 from the memory cell unit 101. At this time, by the terminal B of the transfer capacity 117 turning into the voltage VGR+S2−Nt and the signal φPS2_1 being temporarily turned into the high level, the voltage VRS+S2 output from the transfer unit 113 is held in the memory capacitance 104 of the memory cell unit 101. That is, the transfer unit 113 generates a difference signal between the output signal of the sensor cell unit 100 and the output signal of the memory cell unit 101. The memory cell unit 101 holds the difference signal in the memory capacitance 104.

During a period (6), similarly to the latter half of the period (2), an accumulation signal S3 based on a different accumulation time is held in the memory cell unit 102. Since the signals φSL1, φL, and φFT turn into the high level, a signal of VRS−S3+Ns−Nrst in accordance with the signal S3 that has been subjected to the photoelectric conversion in the sensor cell unit 100 appears in the common signal line 112 from the sensor cell unit 100. That is, the sensor cell unit 100 outputs a signal including the photoelectric conversion signal S3 of the photodiode 103 and the voltage fluctuation Nrst of the photodiode 103 due to the OFF operation of the sensor cell unit writing switch 106 to the common signal line 112. Further, since the signal φGR is turned into the high level, the terminal B of the transfer capacity 117 is reset to have a voltage VGR (=VRS+Vth). Following that, the signal φGR is turned into the low level, and the terminal A and the terminal B of the transfer capacity 117 is caused to enter a floating state. Next, after the signal φSL1 is turned into the low level, the signal φSL2_2 turns into the high level, so that the memory cell unit selection switch M42 is turned ON. Then, a fixed pattern noise Nm2 of the memory cell unit 102 is added to VRS+Nrst−Ns+Nm2+Nt held in the memory capacitance 105 of the memory cell unit 102 during the period (2). Consequently, a voltage VRS−Nrst+Ns−Nt is output from the memory cell unit 102 to the terminal A of the transfer capacity 117 through the common signal line 112. At this time, by the terminal B of the transfer capacity 117 having a voltage VGR+S3−Nt, and the signal φPS2_2 temporarily turning into the high level, a voltage VRS+S3 output from the transfer unit 113 is held in the memory capacitance 105 of the memory cell unit 102. That is, the transfer unit 113 generates a difference signal between the output signal of the sensor cell unit 100 and the output signal of the memory cell unit 102. The memory cell unit 102 holds the difference signal in the memory capacitance 105. By doing so, a signal based on a different accumulation time can be obtained from the sensor cell unit 100 by one time accumulation sequence. Consequently, a plurality of ranging points can be provided in the same line in one time accumulation sequence. Therefore, multipoint of the ranging points and a fast focus detection operation can be realized.

During a period (7), an operation of reading out an optical signal held in the memory capacitance 104 of the memory cell unit 101 for each bit is performed. The signals φSL2_1, φL, φGR, and φFT turn into the high level. Then, the noise Nm1 of the first memory cell unit 101 is added to the optical signal S2 held in the memory capacitance 104 of the first memory cell unit 101, and the voltage VRS−S2+Nm1 is given to the terminal A of the transfer capacity 117, so that the potential of the terminal B becomes VGR (=VRS+Vth). Following that, by the signal φFT turning into the low level, the terminal A of the transfer capacity 117 enters a floating state.

Next, the signals φFB and φPS2_1 turn into the high level, and an output VRS+Nt of the transfer unit 113, which includes the fixed pattern noise Nt is input to the memory cell unit 101. Following that, the signal φPS2_1 turns into the low level, and the voltage VRS+Nt is held in the memory capacitance 104 of the memory cell unit 101.

Figure 13:
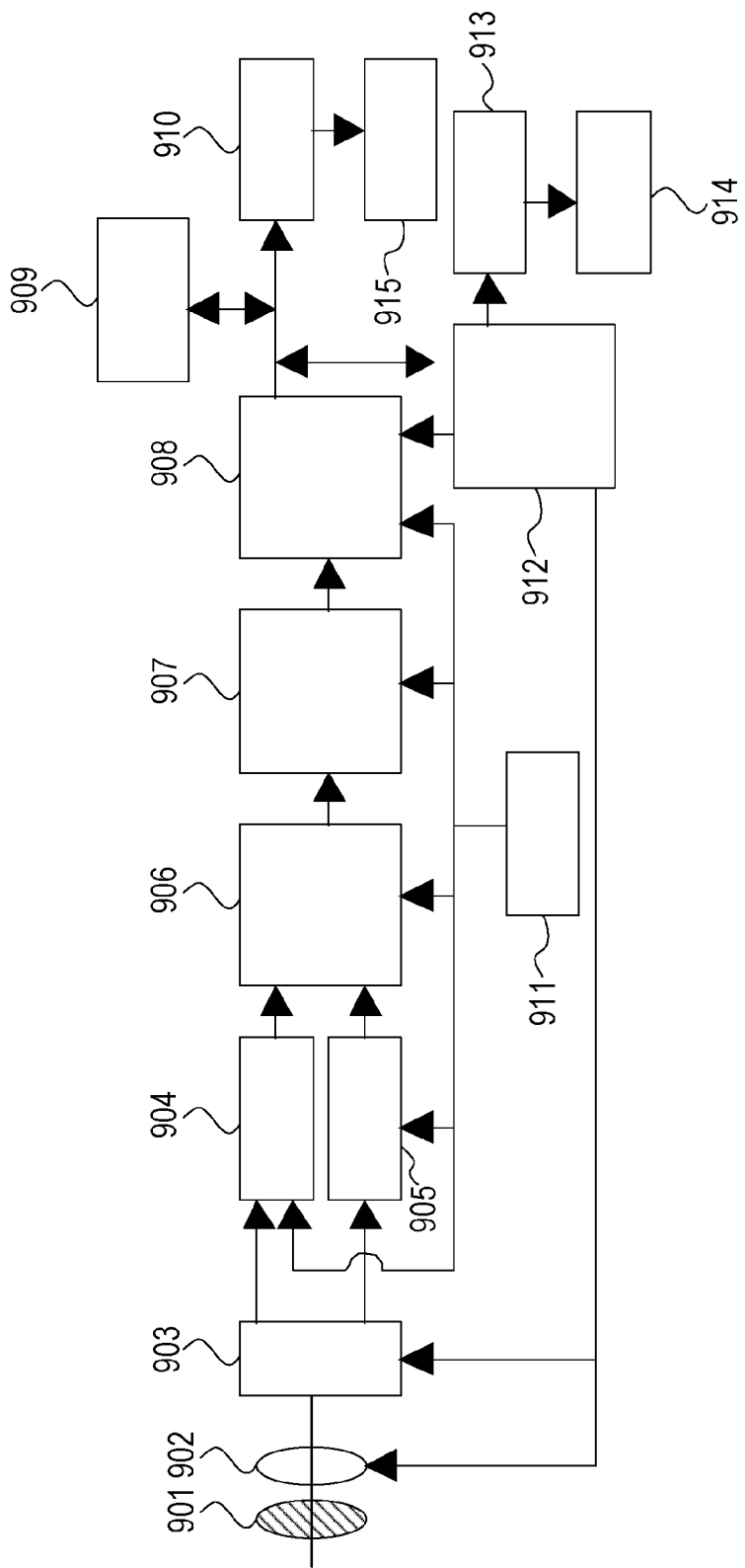
FIG. 13 is a configuration example diagram of an image pickup system according to a sixth embodiment.

Next, the signal φGR is turned into the low level, and the terminal B of the transfer capacity 117 is caused to enter a floating state. Further, the signals φSL2_1, φL, and φFT turn into the high level. Then, the noise Nm1 of the first memory cell unit 101 is added to the voltage VRS+Nt held in the memory capacitance 104 of the first memory cell unit 101. Consequently, the voltage VRS−Nt+Nm1 is given to the terminal A of the transfer capacity 117, and the potential of the terminal B becomes VGR+S2−Nt=VRS+Vth+S2−Nt. The signal output from the transfer unit 113 becomes VRS+S2 by the fixed pattern noise Nt of the transfer unit 113 being added. That is, the transfer unit 113 generates a difference signal between the signal held in the memory capacitance 104 and the fixed pattern noise Nt of the transfer unit 113. As a result, a signal, from which an effect of noise is reduced, is output. When a signal φH is supplied from a shift register 1006 (FIG. 10) during this period, the signal S2 is transmitted to the buffer amplifier 123, and is output to a subsequent signal processing device 906 (FIG. 13).

During a period (8), an operation of reading out an accumulation signal S3 based on a different accumulation time with respect to the memory cell unit 102. The signals φSL2_2, φL, φGR, and φFT turn into the high level. Then, the noise Nm2 of the second memory cell unit 102 is added to the optical signal S3 held in the memory capacitance 105 of the second memory cell unit 102, and the voltage VRS−S3+Nm2 is given to the terminal A of the transfer capacity 117, so that the potential of the terminal B becomes VGR(=VRS+Vth). Following that, by the signal φFT turning into the low level, the terminal A of the transfer capacity 117 enters a floating state.

Next, the signals φFB and φPS2_2 turn into the high level, and an output VRS+Nt of the transfer unit 113, which includes the fixed pattern noise Nt, is input to the memory cell unit 102. Following that, the signal φPS2_2 turns into the low level, the voltage VRS+Nt is held in the memory capacitance 105 of the memory cell unit 102.

Next, the signal φGR is turned into the low level, and the terminal B of the transfer capacity 117 is caused to enter a floating state. Further, the signals φSL2_2, φL, and φFT turn into the high level. Then, the noise of Nm2 of the second memory cell unit 102 is added to the voltage VRS+Nt held in the memory capacitance 105 of the second memory cell unit 102. Consequently, the voltage VRS−Nt+Nm2 is given to the terminal A of the transfer capacity 117, and the potential of the terminal B is turned into VGR+S3−Nt=VRS+Vth+S3−Nt. A signal output from the transfer unit 113 is turned to be VRS+S3 by the fixed pattern noise Nt of the transfer unit 113 is being added. That is, the transfer unit 113 generates a difference signal between the signal held in the memory capacitance 105 and the fixed pattern noise Nt of the transfer unit 113. As a result, a signal, from which an effect of noise is reduced, is output. When the signal φH is supplied from the shift register 1006 (FIG. 10) during this period, the signal S3 is transmitted to the buffer amplifier 123, and is output to the subsequent signal processing device 906 (FIG. 13).

As described above, in the present embodiment, the voltage fluctuation Nrst of the photodiode 103 due to the OFF operation of the writing switch 106 of the sensor cell unit 100 is held in the memory cell unit 101 or 102. Further, the fixed pattern noise Ns of the sensor cell unit 100 and the fixed pattern noise Nm of the memory cell unit 101 or 102, and the fixed pattern noise Nt of the transfer unit 113 are held in the memory cell unit 101 or 102.

Further, the following operations (a) and (b) are performed in the accumulation monitoring and in the accumulation signal holding operation. (a) an output of the sensor cell unit 100 including the accumulation voltage S1, the voltage fluctuation Nrst of the photodiode 103 due to the OFF operation of the writing switch 106 of the sensor cell unit 100, and the fixed pattern noise Ns of the sensor cell unit 100 is obtained. (b) an output of the memory cell unit 101 or 102 including the voltage fluctuation Nrst of the photodiode 103 due to the OFF operation of the writing switch 106 of the sensor cell unit 100, the fixed pattern noise Ns of the sensor cell unit 100, and the fixed pattern noise Nt of the transfer unit 113 is obtained. Then, a difference between (a) and (b) is calculated, and is output from the transfer unit 113.

Further, the following operations (c) and (d) are performed in the signal read out operation. (c) an output of the memory cell unit 101 that holds the optical signal S2 or an output of the memory cell unit 102 that holds the optical signal S3, and (d) an output of the memory cell unit 101 or 102 that holds the fixed pattern noise Nt of the transfer unit 113 are obtained. Then, a difference between (c) and (d) is calculated, and is output from the transfer unit 113.

If the fixed pattern noises of the sensor cell unit 100 and of the transfer unit 113 are held in the sensor cell unit 100, voltage fluctuation of the photodiode 103 occurs when the writing switch 106 is turned OFF. In a case where the writing switch 106 is configured from a MOS transistor, the fluctuation of gate potential is propagated to a source and drain of the MOS transistor when the switch is turned OFF (clock feedthrough). Further, a carrier held under gate when the switch is turned ON is moved to a source or drain when the switch is turned OFF (charge injection). The voltage fluctuation of the source and drain when the switch is turned OFF depends on the potential of the source and drain immediately before the switch is turned OFF. That is, when the fixed pattern noise is held in the photodiode 103 of the sensor cell unit 100 through a switch means, variation corresponding to the fixed pattern noise occurs in the source and drain potential among pixels. Then, the voltage fluctuation amount occurring when the switch is turned OFF varies among bits, and therefore, the fixed pattern noise held in the photodiode 103 is different from the fixed pattern noise that is intrinsically supposed to be removed. As a result, the fixed pattern noise cannot be sufficiently removed from the accumulation signal at the time of AGC, and therefore, AF accuracy is decreased.

In the present embodiment, a signal, from which a noise has been removed, can be read out by the AGC and by reading out a signal without holding the fixed pattern noises of the sensor cell unit 100 and the transfer unit 113 in the sensor cell unit 100. Even if the detected capacity of the sensor cell unit 100 is made small, the variation of the voltage fluctuation among pixels due to an OFF operation of the writing switch 106 does not occur. Therefore, the AGC can be performed with a noise-less signal in a precise manner, whereby highly precise AF can be realized. As a result, even if the detected capacity of the photodiode 103 is decreased in the area-type AF and the sensor sensitivity is enhanced, highly precise AF can be realized.

In the present embodiment, an example of providing two memory cell units 101 and 102 has been described. However, the number of the memory cell units can be one, or three or more. In a case of three or more, control corresponding to the operations of the periods (2), (4), (6), and (8) is performed with respect to the added memory cell unit.

Figure 10:
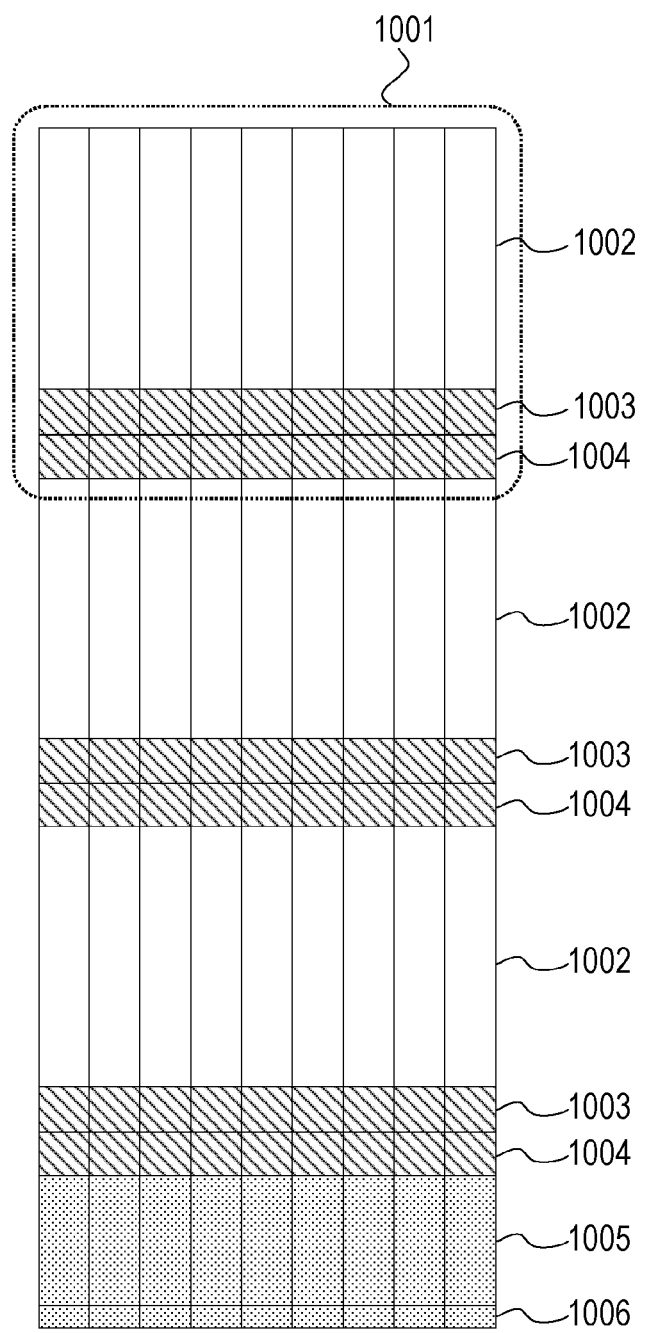
FIG. 10 is a first layout diagram according to the first embodiment.
Figure 11:
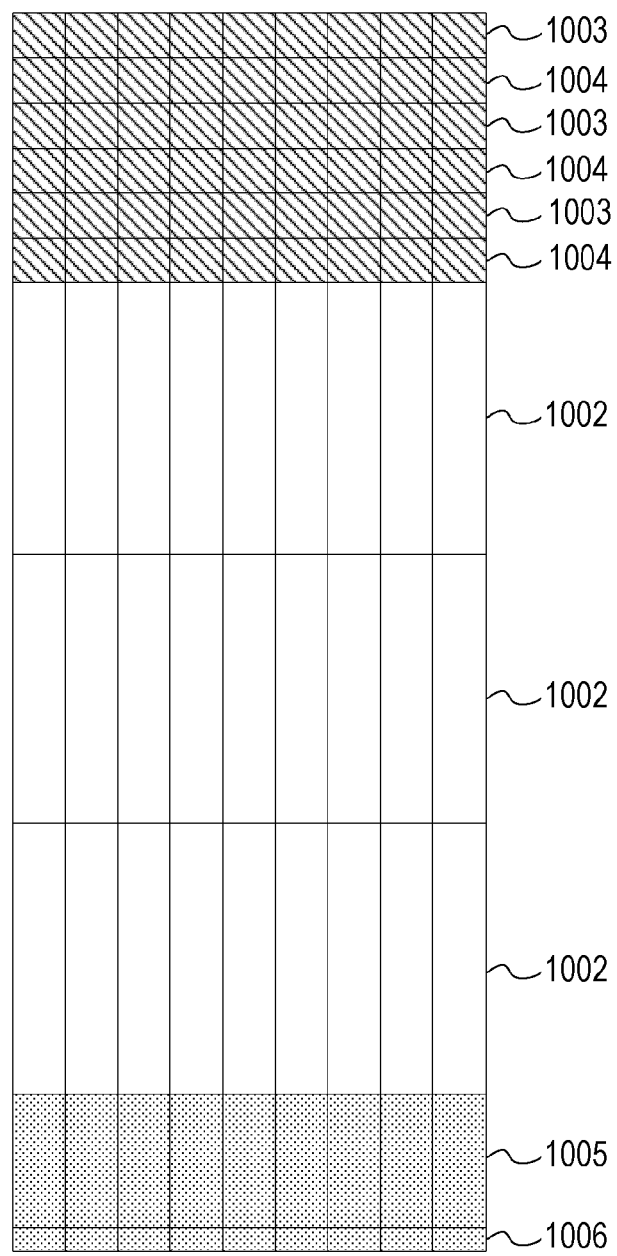
FIG. 11 is a second layout diagram according to the first embodiment.

FIGS. 10 and 11 are diagrams illustrating layout examples of the photoelectric conversion apparatus illustrated in FIG. 3. In FIG. 10, the line sensor unit 1001 corresponds to the line sensor units L1A and L2A, and the like in FIG. 2. A sensor cell unit 1002 includes a plurality of sensor cell units 100 in FIG. 2. A first memory cell unit 1003 includes a plurality of first memory cell units 101 in FIG. 2. A second memory cell unit 1004 includes a plurality of second memory cell unit 102 in FIG. 2. A transfer unit 1005 includes a plurality of transfer unit 113 in FIG. 2. A shift register 10006 outputs a signal φH to a circuit of FIG. 3. The sensor cell unit 1002 and the two memory cell units 1003 and 1004 make one set, and the sets are arranged in a matrix manner. The transfer unit 1005 and the shift register 1006 are commonly provided to the plurality of sensor cell units 1002, memory cell units 1003 and 1004 provided in each line.

FIG. 11 is a diagram of a case in which a region is divided into a region in which only the sensor cell unit 1002 is arranged and a region in which only the memory cell units 1003 and 1004 are arranged and laid out. In this layout, the transfer unit 1005 and the shift register 1006 are also commonly provided to the plurality of sensor cell units 1002 and memory cell units 1003 and 1004 provided in each line.

Further, one transfer unit 113 may just be disposed at the line sensor units L1A and L2A in a plurality of lines. Therefore, the layout area has enough room, compared with the sensor cell unit 100, and the memory cell units 101 and 102. As an example, a function to remove the offset of the source follower can be provided in the transfer unit 113. In that case, the fixed pattern noise Ntr of the transfer unit 113 is negligible from the description of the signal propagation in the present embodiment.

Second Embodiment

Figure 4:
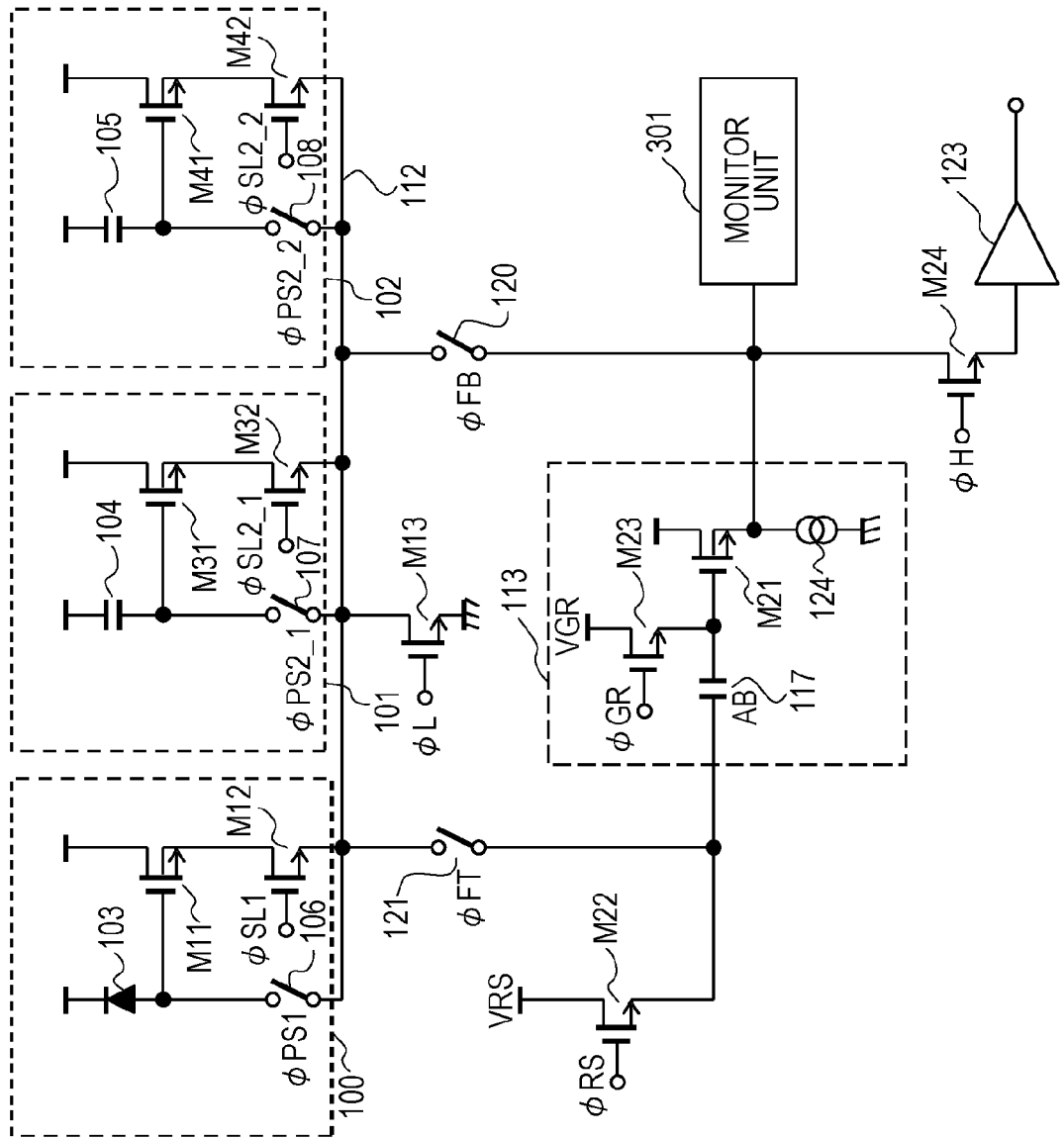
FIG. 4 is a circuit diagram of a photoelectric conversion apparatus according to a second embodiment.

FIG. 4 is a diagram illustrating a configuration example of a photoelectric conversion apparatus according to a second embodiment. Description common to FIG. 3 is omitted. A difference from FIG. 3 is that the inverting amplifier having a gain of −1 in FIG. 3 is changed to a non-inverting amplifier of a source follower having a gain of 1 in FIG. 4. Self bias transistors M11, M31, and M41 along with a load MOS transistor M13 configure the source follower non-inverting amplifier having a gain of 1. A sensor cell unit 100 outputs an accumulation signal based on an amount of electric charges that has been subjected to photoelectric conversion in a photodiode 103 to a common signal line 112 through a sensor cell unit non-inverting amplifier of the transistor M11. A memory cell unit 101 outputs a signal based on a signal held in a memory capacitance 104 to the common signal line 112 through a memory cell unit non-inverting amplifier of the transistor M31. A memory cell unit 102 outputs a signal based on a signal held in a memory capacitance 105 to the common signal line 112 through a memory cell unit non-inverting amplifier of the transistor M41.

Figure 7:
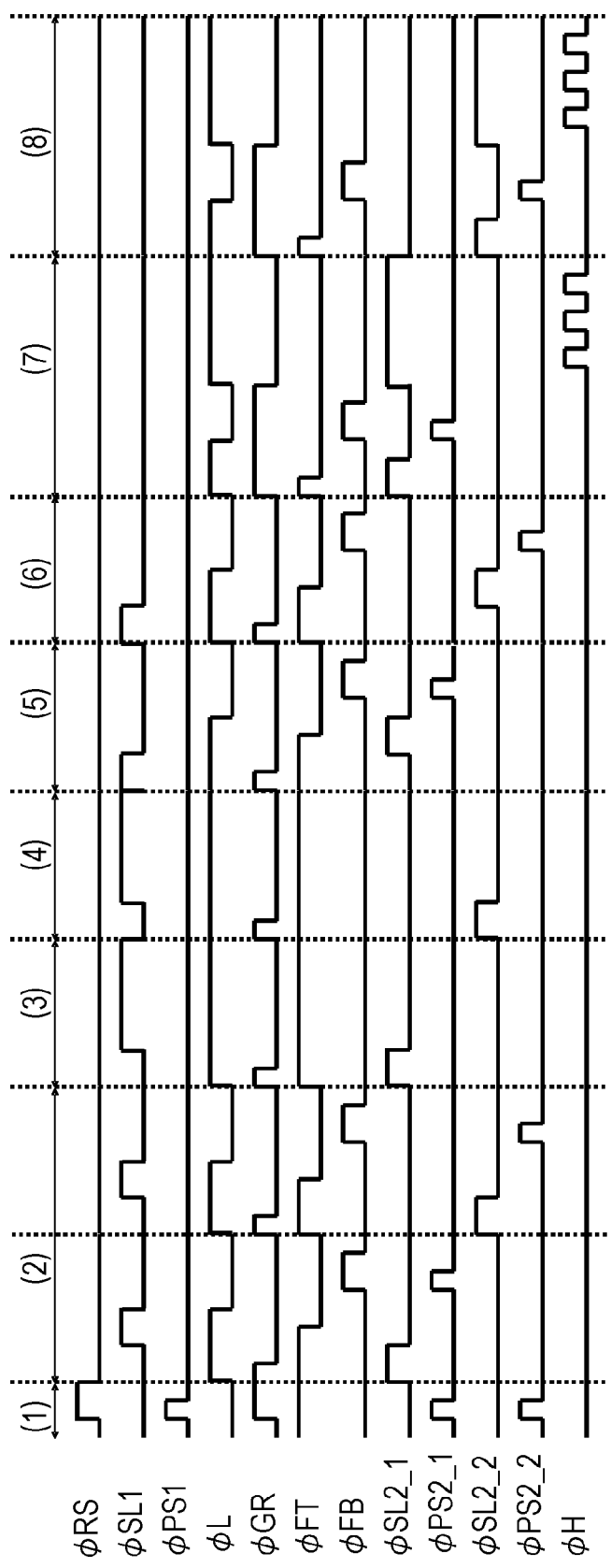
FIG. 7 is a timing diagram according to the second embodiment.

An operation of the second embodiment will be described with reference to FIG. 7. An operation during a period (1) is equivalent to the first embodiment, and therefore, description is omitted. A difference from the first embodiment is reset voltages VRS and VGR. VRS is changed from VRS to VRS+Vth, and VGR is changed from VRS+Vth to VRS+2Vth, respectively, where an input/output voltage offset amount by the above-described source follower amplifier is Vth. Here, Vth is a common offset amount to pixels, and is determined from a typical source follower circuit in a sensor.

During a period (2), an operation of writing voltage fluctuation Nrst and a fixed pattern noise Ns of the sensor cell unit 100 in the memory cell units 101 and 102 through a transfer unit 113. After signals φPS1, φPS2_1, φPS2_2, and φRS turn into a low level, signals φSL2_1 and φL turn into a high level. Then, a signal VRS+Nm1 including a fixed pattern noise Nm1 is output from the memory cell unit 101, and is written in a terminal A of a transfer capacity 117. Then, by a signal φGR turning into the low level, a terminal B of the transfer capacity 117 enters a floating state. Next, the signal φSL2_1 turns into the low level, and a signal φSL1 turns into the high level, so that VRS+Nrst+Ns, which is the voltage fluctuation Nrst of the sensor cell unit 100 and the fixed pattern noise Ns of the sensor cell unit 100 being added to the reset potential VRS, is output. Since the terminal A of the transfer capacity 117 is changed to VRS+Nrst+Ns, the potential of the terminal B of the transfer capacity 117 becomes VGR+Nrst+Ns−Nm1=VRS+2Vth+Nrst+Ns−Nm1. Next, a signal φFB turns into the high level. Then, a voltage VRS+Vth+Nrst+Ns−Nm1+Nt, which is Vth of the source follower of the transfer unit 113 and the fixed pattern noise Nt being superimposed on the voltage VRS+2Vth+Nrst+Ns−Nm1 held in the terminal B of the transfer capacity 117, is output to the common signal line 112. During this period, the signal φPS2_1 is temporarily turned into the high level, so that the voltage VRS+Vth+Nrst+Ns−Nm1+Nt is written in the memory capacitance 104 of the memory cell unit 101. A similar operation is performed with respect to the memory cell unit 102, and the voltage VRS+Vth+Nrst+Ns−Nm2+Nt is written in the memory capacitance 105 of the memory cell unit 102. Here, Nm2 is a fixed pattern noise of the memory cell unit 102.

During a period (3), an AGC operation is performed. Since the signals φSL2_1, φL, and φFT turn into the high level, the fixed pattern noise Nm1 of the memory cell unit 101 is added to the voltage VRS+Vth+Nrst+Ns−Nm1+Nt held in the memory capacitance 104 of the memory cell unit 101 during the period (2). Consequently, VRS+Nrst+Ns+Nt is output from the memory cell unit 101 to the terminal A of the transfer capacity 117 through the common signal line. Further, the signal φGR is turned into the high level, the terminal B of the transfer capacity 117 is reset to have a voltage VGR (=VRS+2Vth). Following that, the signal φGR is turned into the low level, and the terminal B of the transfer capacity 117 is caused to enter a floating state.

Next, since the signal φSL2_1 turns into the low level and the signal φSL1 turns into the high level, a signal VRS+S1+Ns+Nrst according to a signal S1 that has been subjected to photoelectric conversion in the sensor cell unit 100 is output from the sensor cell unit 100 to the terminal A of the transfer capacity 117. At this time, the terminal B of the transfer capacity 117 is turned to have a voltage VGR+S1−Nt, and a voltage VRS+Vth+S1 is output from the transfer unit 113. An AGC operation in a monitor unit 301 is similar to the first embodiment. Since Vth is a common offset amount to pixels, it cannot be a cause of pixel variation. A similar operation is performed in the memory cell unit 102 during a period (4).

In a period (5), an operation of holding an accumulation signal S2 in the memory cell unit 101 is performed after the accumulation ends. Since the signals φSL1, φL, and φFT turn into the high level, a signal VRS+S2+Ns+Nrst according to the signal S2 that has been subjected to photoelectric conversion in the sensor cell unit 100 appears in the common signal line 112 from the sensor cell unit 100. Further, the signal φGR is turned into the high level, the terminal B of the transfer capacity 117 is reset to have a voltage VGR (=VRS+2Vth). Following that, the signal φGR is turned into the low level, and the terminal A and the terminal B of the transfer capacity 117 are caused to enter a floating state. Next, after the signal φSL1 is turned into the low level, the signal φSL2_1 turns into the high level. Then, the fixed pattern noise Nm1 of the memory cell unit 101 is added to the voltage VRS+Vth+Nrst+Ns−Nm1+Nt held in the memory capacitance 104 of the memory cell unit 101 during the period (2). Consequently, the voltage VRS+Nrst+Ns+Nt is output from the memory cell unit 101 to the terminal A of the transfer capacity 117 through the common signal line 112. At this time, the terminal B of the transfer capacity 117 has a voltage VGR−S2+Nt, and the signal φPS2_1 turns into the high level, so that the voltage VRS+Vth−S2+2Nt output from the transfer unit 113 is held in the memory capacitance 104 of the memory cell unit 101.

During a period (6), similarly to the period (5), an accumulation signal S3 based on a different accumulation time is held in the memory capacitance 105 of the memory cell unit 102. By doing so, a signal based on a different accumulation time can be obtained from the sensor cell unit 100 by one time accumulation sequence. Consequently, a plurality of ranging points can be provided in the same line in one time accumulation sequence. Therefore, multipoint of the ranging points and a fast focus detection operation can be realized.

During a period (7), an operation of reading out an optical signal held in the memory cell unit 101 for each bit is performed. The signals φSL2_1, φL, φGR, and φFT turn into the high level. Then, a noise Nm1 of the first memory cell unit 101 is added to the voltage VRS+Vth−S2+2Nt held in the memory capacitance 104 of the first memory cell unit 101. Consequently, the voltage VRS−S2+Nm1+2Nt is given to the terminal A of the transfer capacity 117, and the potential of the terminal B of the transfer capacity 117 is turned to have the voltage VGR (=VRS+2Vth). Following that, the signal φFT turns into the low level, so that the terminal A of the transfer capacity 117 enters a floating state.

Next, the signals φFB and φPS2_1 turn into the high level, an output VRS+Vth+Nt of the transfer unit 113, which includes a fixed pattern noise Nt is input to the memory cell unit 101. Following that, the signal φPS2_1 turns into the low level, and the voltage VRS+Vth+Nt is held in the memory capacitance 104 of the memory cell unit 101.

Next, the signal φGR is turned into the low level, and the terminal B of the transfer capacity 117 is caused to enter a floating state. Further, when the signals φSL2_1, φL, and φFT turn into the high level, the noise Nm1 of the first memory cell unit 101 is added to the fixed pattern noise Nt held in the memory capacitance 104 of the first memory cell unit 101. Consequently, the voltage VRS+Nt+Nm1 is given to the terminal A of the transfer capacity 117, and the potential of the terminal B of the transfer capacity 117 becomes VGR+S2−

Nt=VRS+2Vth+S2−Nt. The signal output from the transfer unit 113 is turned to have a voltage VRS+Vth+S2 by the fixed pattern noise Nt of the transfer unit 113 being added. As a result, a signal, from which an effect of noise is reduced, is output. When a signal φH is supplied from a shift register 1006 (FIG. 10) during this period, the signal S2 is transmitted to a buffer amplifier 123, and is output to a subsequent signal processing device 906 (FIG. 13).

During a period (8), similarly to the period (7), an operation of reading out an accumulation signal S3 based on a different accumulation time is performed with respect to the memory cell unit 102.

As described above, in the present embodiment, outputs of the sensor cell unit 100 and the memory cell units 101 and 102 are changed from an inversing output of the first embodiment to a non-inverting output of the self-bias source follower. A driving pattern is changed so that the fixed pattern noise occurring in the sensor cell unit 100, the memory cell units 101 and 102, and the transfer unit 113 can be removed even if the sensor cell unit 100 and the memory cell units 101 and 102 outputs a non-inverting output.

The inverting amplifier used in the first embodiment has a difficulty of realizing layout space saving and enhancement of output characteristics at the same time. This is because that a layout area becomes large if a switched capacitor configured from a differential amplifier and a feedback capacitor is used. Since pixel aperture positions on a sensor of an AF sensor is limited by an arrangement of ranging points on a finder due to an optical system, if the layout of the inverting amplifier becomes large, the ranging points cannot be closely disposed, resulting in a cause of deterioration of the AF characteristics.

Further, in the source ground inverting amplifier used in the first embodiment, the linearity of an output is deteriorated due to a substrate bias effect. Further, since the driving current is largely changed in accordance with an input of the inverting amplifier, power saving of the sensor and circuit responsiveness cannot be satisfied at the same time. Further, the gain of an output is changed due to the relative variation of a transistor of the inverting amplifier, and therefore, PRNU is more likely to be deteriorated.

On the other hand, by using a non-inverting output of the self-bias source follower like the present embodiment, advantages can be obtained with respect to the source ground inverting amplifier, such as satisfactory linearity, a stable driving current, and the relative variation being less likely to be influenced by PRNU.

Third Embodiment

Figure 8:
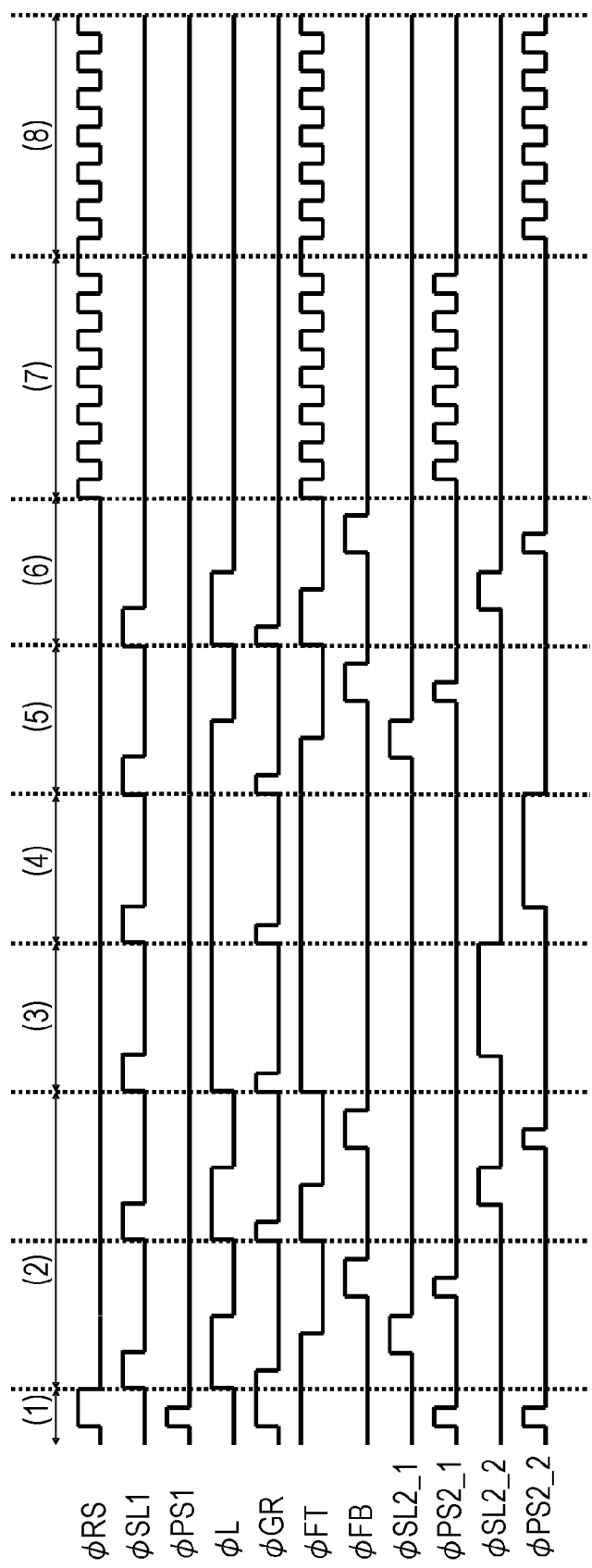
FIG. 8 is a timing diagram according to a third embodiment.

An operation of a photoelectric conversion apparatus according to a third embodiment will be described with reference to FIG. 8. Operations during periods (1) to (6) are equivalent to the first embodiment, and therefore, description is omitted.

During a period (7), when a signal φPS2_1 is sequentially turned into a high level by a shift register for each pixel, a memory cell unit writing switch 107 is turned ON. Signals φRS and φFT are complementarily turned into a high level with respect to the signal φPS2_1. As a result, an optical signal S2 held in a memory capacitance 104 by previous periods is propagated to an input of a buffer amplifier 123 through a common signal line 112. Therefore, a pixel signal can be sequentially read out. A voltage input to the buffer amplifier 123 is determined by a capacity ratio between a parasitic capacity of the common signal line 112 and the buffer amplifier 123, and the memory capacitance 104.

During a period (8), similarly to the period (7), an operation of reading out an accumulation signal S3 based on a different accumulation time with respect to the memory cell unit 102 is performed. A signal φPS2_2 is sequentially turned into the high level by the shift register for each pixel. Signals φRS and φFT are complementarily turned into the high level with respect to the signal φPS2_2. As a result, an optical signal S3 held in the memory capacitance 105 by previous periods is propagated to an input of the buffer amplifier 123 through the common signal line 112, and therefore, a pixel signal can be sequentially read out. A voltage input to the buffer amplifier 123 is determined by a capacity ratio between the parasitic capacity of the common signal line 112 and the buffer amplifier 123, and the memory capacitance 105.

As described above, in the present embodiment, an accumulation signal held in the memory cell units 101 and 102 can be read out by charge transfer to the common signal line 112 through the switches 107 and 108 directly connected to the memory capacities 104 and 105.

Consequently, a signal propagation operation between the memory cell units 101 and 102, and the transfer unit 113 can be omitted, which has been performed in the periods (7) and (8) in the first and second embodiments in order to remove the fixed pattern noise Nm of the memory cell units 101 and 102. Further, a time constant of the charge transfer is determined by on-resistance of the switches 107 and 108 and the parasitic capacity of the common signal line 112. Therefore, high-speed read out speed can be realized, compared with an output of the inverting amplifier of the transfer unit 113. The present embodiment can be applied to the circuit of FIG. 4 in the second embodiment.

Fourth Embodiment

Figure 5:
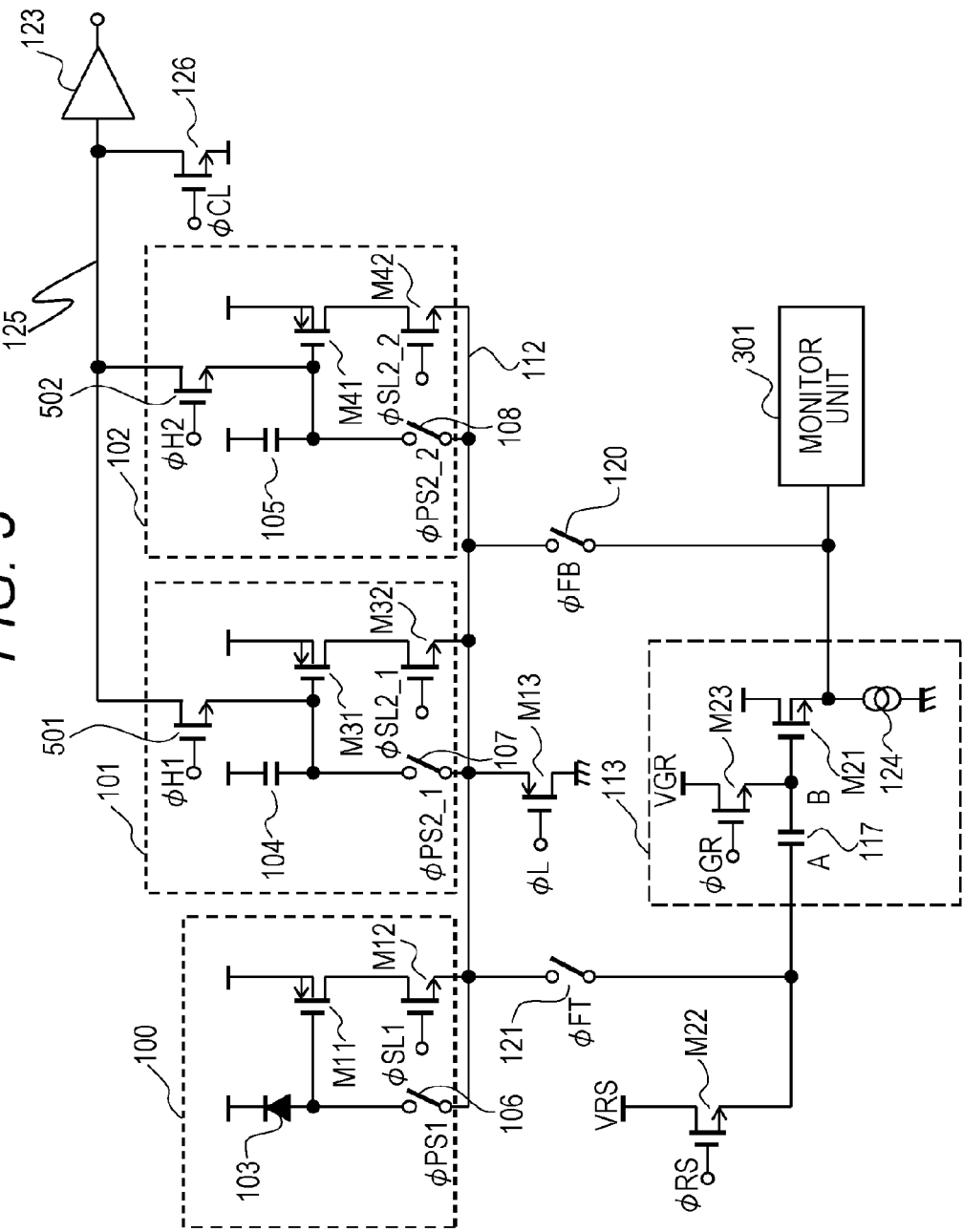
FIG. 5 is a circuit diagram of a photoelectric conversion apparatus according to a fourth embodiment.

FIG. 5 is a diagram illustrating a configuration example of a photoelectric conversion apparatus according to a fourth embodiment. Description common to FIG. 3 is omitted. In the present embodiment, the read out path configured from the switch M24 of the signal φH and the buffer amplifier 123 in FIG. 3 is changed to read out switches 501 and 502 of signals φH1 and φH2 of FIG. 5 and an initialization switch 126 of a signal φCL. The read out switches 501 and 502 are controlled by the signals φH1 and φH2 driven by a shift register. The initialization switch 126 is a switch for initializing a read out line 125 connected to the read out switches 501 and 502 to predetermined potential. A memory cell unit 101 includes the read out switch 501 provided between a memory capacitance 104 and the read out line 125. A memory cell unit 102 includes the read out switch 502 provided between a memory capacitance 105 and the read out line 125.

Figure 9:
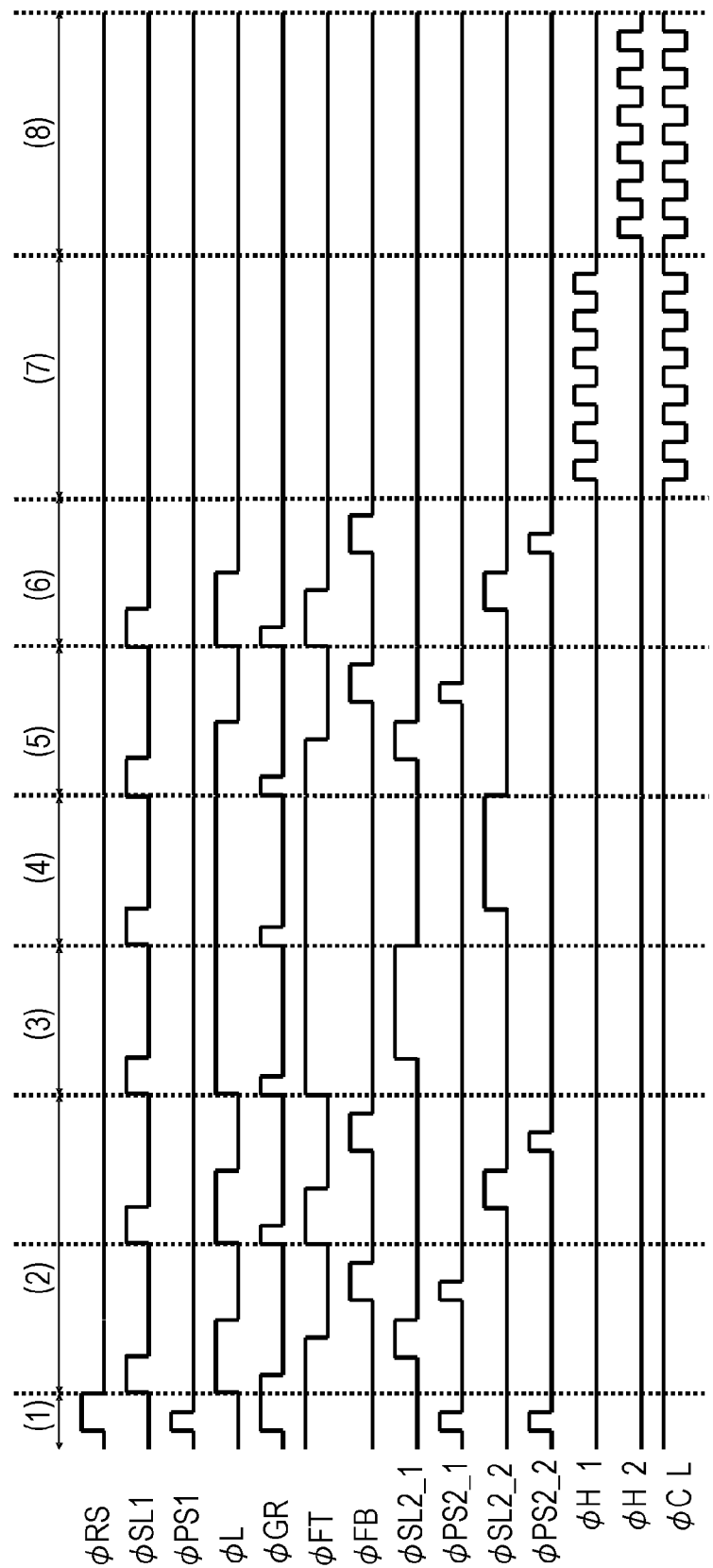
FIG. 9 is a timing diagram according to the fourth embodiment.

An operation of the photoelectric conversion apparatus according to the fourth embodiment will be described with reference to FIG. 9. Operations during periods (1) to (6) are equivalent to the first and third embodiments, and therefore, description is omitted.

During a period (7), the read out switch 501 of a signal φH1, which is sequentially turned ON by a shift register for each pixel, and the initialization switch 126 of a signal φCL are alternately turned ON. As a result, since an optical signal S2 held in the memory capacitance 104 by previous periods is propagated to an input of an buffer amplifier 123 through the read out line 125, a pixel signal can be sequentially read out. The voltage input to the buffer amplifier 123 is determined by the capacity ratio between the parasitic capacity of the read out line 125 and the buffer amplifier 123, and the memory capacitance 104.

During a period (8), an operation of reading out an accumulation signal S3 based on a different accumulation time is performed with respect to the memory cell unit 102. The read out switch 502 of the signal φH2 sequentially turned ON by the shift register for each pixel and the initialization switch 126 of the signal φCL are alternately turned ON. As a result, the optical signal S3 held in the memory capacitance 105 by previous periods is propagated to an input of the buffer amplifier 123 through the read out line 125. Therefore, a pixel signal can be sequentially read out. The voltage input to the buffer amplifier 123 is determined by the capacity ratio between the parasitic capacity of the read out line 125 and the buffer amplifier 123, and the memory capacitance 105.

As described above, in the present embodiment, the accumulation signal held in the memory cell units 101 and 102 can be read out to the read out line 125 by charge transfer through the read out switches 501 and 502 directly connected to the memory capacities 104 and 105. In the third embodiment, the charge transfer is performed from the memory capacities 104 and 105 to the common signal line 112. By using the read out line 125 for signal read out, the number of connected elements that do not operate at the time of signal read out can be minimized. As a result, the parasitic capacity of the read out line 125 can be made smaller than the parasitic capacity of the common signal line 112 of the third embodiment, whereby the read out speed can be increased and the SN can be improved. The embodiment can be applied to a circuit of FIG. 4 in the second embodiment.

Fifth Embodiment

Figure 12:
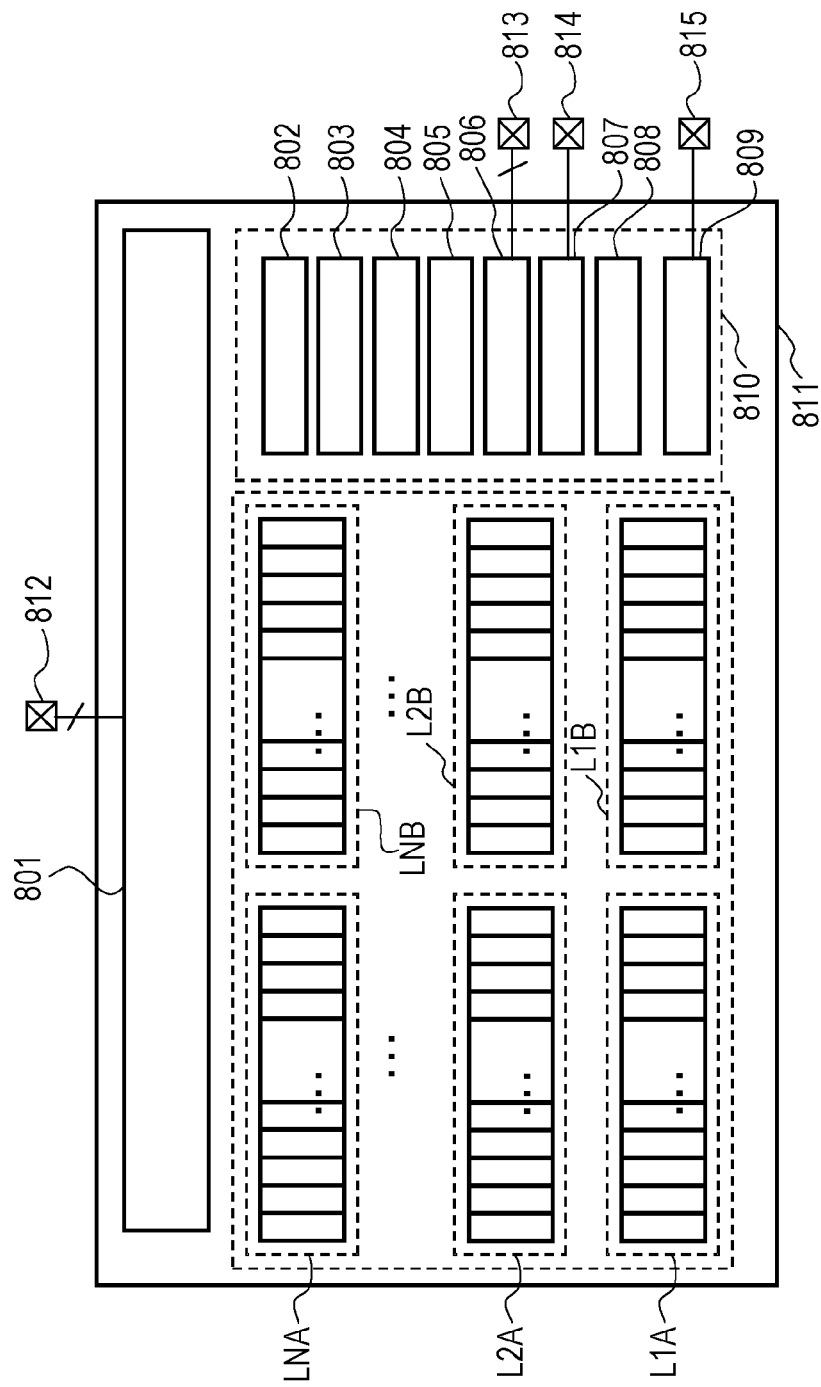
FIG. 12 is a block diagram of an AF sensor according to a fifth embodiment.

FIG. 12 is a diagram illustrating a configuration example of a focus detection apparatus (hereinafter, referred to as AF sensor) 811 of a phase difference detection method according to a fifth embodiment. The AF sensor 811 includes a photoelectric conversion apparatus of the first to fourth embodiments. The AF sensor 811 includes a sensor block in which line sensor units L1A, L2A, . . . , and L1B, L2B, . . . are arranged, a logic block 801 including a function of generating a timing signal of an external interface and an AF sensor, and an analog circuit block 810. The analog circuit block 810 includes AGC circuits 802 to 805, and monitors a signal from the line sensor units L1A to LNA, and L1B to LNB and controls an accumulation time. The analog circuit block 810 further includes a reference voltage/current generation circuit 806 that generates a reference voltage and a reference current used in the photoelectric conversion apparatus, a thermometer circuit 807, and the like. Terminals 813 and 814 are external communication terminals. The logic block 801 controls a driving timing of the AF sensor 811 by serial communication with an outside through a serial communication terminal 812. Even in the present embodiment, by using a photoelectric conversion apparatus of the first to fourth embodiments, a high-speed and high-precision focus detection operation can be realized.

Sixth Embodiment

FIG. 13 is a block diagram illustrating a configuration example of an image pickup system according to a sixth embodiment. A barrier 901 protects a lens 902 described below, the lens 902 focuses an optical image of an object to a solid-state image pickup apparatus 904, and a diaphragm 903 adjusts an amount of light that passes through the lens 902. The solid-state image pickup apparatus 904 acquires the optical image of the object focused by the lens 902 as an image signal. An AF sensor 905 includes a photoelectric conversion apparatus described in the above embodiments. A signal processing device 906 processes a signal output from the solid-state image pickup apparatus 904 and the AF sensor 905, and an A/D converter 907 performs analog/digital conversion on a signal output from the signal processing device 906. A digital signal processing unit 908 performs various types of correction on image data output from the A/D converter 907, and compresses data. A memory unit 909 temporarily stores image data, an external I/F circuit 910 performs communication with external computers, and a timing generation unit 911 outputs various timing signals to the digital signal processing unit 908, and the like. A general control/calculation unit 912 controls various types of calculation and a whole camera, a recording medium control I/F unit 913, a recording medium 914 is a detachable medium that records/reads out acquired image data, such as a semiconductor memory, and an external computer 915.

Next, an operation at the time of image pickup by the image pickup system will be described. The barrier 901 is opened, and the general control/calculation unit 912 calculates a distance to an object by phase difference detection based on a signal output from the AF sensor 905. Following that, the lens 902 is driven based on a calculation result, whether it is focused again is determined, and when it is determined that it is not focused, auto-focusing control that drives the lens 902 again is performed. Next, after focusing is confirmed, an accumulating operation by the solid-state image pickup apparatus 904 starts. After the accumulating operation by the solid-state image pickup apparatus 904 is completed, an image signal output from the solid-state image pickup apparatus 904 is subjected to analog/digital conversion by the A/D converter 907, passes through the digital signal processing unit 908, and is written in the memory unit 909 by the general control/calculation unit 912. Following that, data accumulated in the memory unit 909 is recorded on the recording medium 914 by control by the general control/calculation unit 912 through the recording medium control I/F unit 913. Further, the data may be directly input to a computer through the external I/F circuit 910.

Note that the above described embodiments merely illustrate specific examples in implementing one or more aspects of the embodiments, and the technical scope of the disclosure should not be interpreted in a limited way. That is, the disclosure can be implemented in various forms without departing from the technical idea or principal characteristics.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the embodiments have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-150839, filed Jul. 4, 2012, which is hereby incorporated by reference herein in its entirety.

What is claimed is:

1. A photoelectric conversion apparatus comprising:
a sensor cell unit including a photoelectric conversion unit and a sensor cell unit writing switch connected to the photoelectric conversion unit;
a memory cell unit including a memory capacitance and a memory cell unit writing switch connected to the memory capacitance; and
a common signal line connected to the sensor cell unit and the memory cell unit,
wherein the memory cell unit holds a signal including voltage fluctuation of the photoelectric conversion unit due to an OFF operation of the sensor cell unit writing switch, a fixed pattern noise of the sensor cell unit, and a fixed pattern noise of the memory cell unit, to the memory capacitance before holding a signal of the photoelectric conversion unit to the memory capacitance.

2. The photoelectric conversion apparatus according to claim 1, wherein the sensor cell unit outputs a signal including a photoelectric conversion signal of the photoelectric conversion unit and voltage fluctuation of the photoelectric conversion unit due to an OFF operation of the sensor cell unit writing switch to the common signal line, and
the memory cell unit outputs a signal held in the memory capacitance to the common signal line, and
the photoelectric conversion apparatus further comprises a transfer unit configured to generate a difference signal between an output signal of the sensor cell unit and an output signal of the memory cell unit.

3. The photoelectric conversion apparatus according to claim 2, further comprising a gain variable amplifying unit configured to perform auto gain control based on the difference signal generated by the transfer unit.

4. The photoelectric conversion apparatus according to claim 2, wherein the memory cell unit holds the difference signal in the memory capacitance.

5. The photoelectric conversion apparatus according to claim 4, wherein the transfer unit generates a difference signal between the difference signal held in the memory capacitance and a fixed pattern noise of the transfer unit.

6. The photoelectric conversion apparatus according to claim 4, wherein the memory cell unit includes
a memory cell unit amplifier, and
a memory cell unit selection switch for outputting an output signal of the memory cell unit amplifier to the common signal line, and
the memory cell unit outputs the signal including voltage fluctuation of the photoelectric conversion unit due to an OFF operation of the sensor cell unit writing switch, a fixed pattern noise of the sensor cell unit, and a fixed pattern noise of the memory cell unit stored in the memory capacitance to the common signal line by turning on the memory cell unit selection switch, and
outputs the difference signal held in the memory capacitance to the common signal line by turning on the memory cell unit writing switch.

7. The photoelectric conversion apparatus according to claim 4, further comprising a read out line,
wherein the memory cell unit includes
a memory cell unit amplifier,
a memory cell unit selection switch for outputting an output signal of the memory cell unit amplifier to the common signal line, and
a read out switch provided between the memory capacitance and the read out line, and
the memory cell unit outputs the signal including voltage fluctuation of the photoelectric conversion unit due to an OFF operation of the sensor cell unit writing switch, a fixed pattern noise of the sensor cell unit, and a fixed pattern noise of the memory cell unit stored in the memory capacitance to the common signal line by turning on the memory cell unit selection switch, and
outputs the difference signal held in the memory capacitance to the read out line by turning on the read out switch.

8. The photoelectric conversion apparatus according to claim 1, wherein the sensor cell unit includes a sensor cell unit inverting amplifier configured to output a signal based on the signal of the photoelectric conversion unit, and
the memory cell unit includes a memory cell unit inverting amplifier configured to output a signal based on the signal held in the memory capacitance.

9. The photoelectric conversion apparatus according to claim 1, wherein the sensor cell unit includes a sensor cell unit non-inverting amplifier configured to output a signal based on the signal of the photoelectric conversion unit, and
the memory cell unit includes a memory cell unit non-inverting amplifier configured to output a signal based on the signal held in the memory capacitance.

10. A focus detection apparatus comprising the photoelectric conversion apparatus according to claim 1.

11. An image pickup system comprising:
the focus detection apparatus according to claim 10;
an image pickup apparatus, and
a lens configured to focus an optical image.

12. The photoelectric conversion apparatus according to claim 1,
wherein the sensor cell unit includes a sensor cell unit amplifier and a sensor cell unit selection switch between the sensor cell unit amplifier and the common signal line,
wherein the memory cell unit includes a memory cell unit amplifier and a memory cell unit selection switch between the memory cell unit amplifier and the common signal line, and
wherein the sensor cell unit writing switch, the sensor cell unit selection switch, and the memory cell unit selection switch turn on before the memory cell unit writing switch turns on.

13. A method of driving a photoelectric conversion apparatus including a sensor cell unit including a photoelectric conversion unit and a sensor cell unit writing switch connected to the photoelectric conversion unit,
a memory cell unit including a memory capacitance, a memory cell unit writing switch connected to the memory capacitance, and a memory cell unit selection switch configured to output a signal from the memory capacitance, and
a common signal line connected to the sensor cell unit and the memory cell unit,
the method comprising:
holding a signal of the photoelectric conversion unit to the memory capacitance by turning on the memory cell unit writing switch after resetting the sensor cell unit and the memory cell unit by turning ON the sensor cell unit writing switch and the memory cell unit writing switch, and turning on the memory cell unit selection switch between the resetting and the holding.

\* \* \* \* \*